(12) United States Patent
Larignon et al.

(10) Patent No.: US 12,055,651 B2
(45) Date of Patent: Aug. 6, 2024

(54) METHOD AND SYSTEM FOR GEOLOCATING AN OBJECT USING A MOBILE BASE STATION

(71) Applicant: SIGFOX, Labege (FR)

(72) Inventors: Guillaume Larignon, Labege (FR); Renaud Marty, Ramonville Saint Agne (FR); Perrine Gissot, Villaries (FR); Olivier Isson, Lauzerville (FR)

(73) Assignee: SIGFOX, Labege (FR)

( * ) Notice: Subject to any disclaimer, the term of this patent is extended or adjusted under 35 U.S.C. 154(b) by 450 days.

(21) Appl. No.: 17/613,030

(22) PCT Filed: May 25, 2020

(86) PCT No.: PCT/EP2020/064408
§ 371 (c)(1),
(2) Date: Nov. 19, 2021

(87) PCT Pub. No.: WO2020/239674
PCT Pub. Date: Dec. 3, 2020

(65) Prior Publication Data
US 2022/0221551 A1 Jul. 14, 2022

(30) Foreign Application Priority Data
May 28, 2019 (FR) ..................................... 1905636

(51) Int. Cl.
 *G01S 19/42* (2010.01)
 *G01S 5/00* (2006.01)
 *G01S 5/02* (2010.01)
(52) U.S. Cl.
 CPC .......... *G01S 5/0289* (2013.01); *G01S 5/0009* (2013.01); *G01S 19/42* (2013.01)

(58) Field of Classification Search
 CPC ................................ G01S 5/0289; G01S 19/42
 (Continued)

(56) References Cited

U.S. PATENT DOCUMENTS 6,397,073 B1 * 5/2002 Hottinen ................ G01C 21/30
 455/457
8,994,591 B2 * 3/2015 Dupray ................. H04W 64/00
 342/465

(Continued)

FOREIGN PATENT DOCUMENTS

EP 2979108 A1 2/2016

OTHER PUBLICATIONS

Mauve et al., "A survey on position-based routing in mobile ad hoc networks," IEEE Network, Nov. 1, 2001, pp. 30-39, vol. 15, No. 6, IEEE Service Center, NY, NY, US.

*Primary Examiner* — Qutbuddin Ghulamali
(74) *Attorney, Agent, or Firm* — H&I PARTNERS; Chai Im; C. Andrew Im

(57) ABSTRACT

A method for geolocating a terminal of a wireless communication system from measurements of a parameter representative of a radio signal exchanged between the terminal and base stations of the communication system. The method uses fixed base stations and a mobile base station which is displaced in a determined search area. During a predefined search period, the terminal emits several radio signals to the fixed base stations and the mobile base station. A precise geographical position can then be determined, on the one hand, from the measurements carried out during the search period for the different base stations, and on the other hand, from the geographical positions of the fixed base stations and from the geographical positions of the mobile base station at the different times of emission of the radio signals by the terminal.

9 Claims, 5 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 2005/0075111 A1* | 4/2005 | Tafazolli ................... | G01S 5/02 455/452.2 |
| 2016/0142884 A1* | 5/2016 | Sears ................... | H04W 40/244 455/404.2 |
| 2022/0342942 A1* | 10/2022 | Cheng ................... | G06F 16/951 |

* cited by examiner

METHOD AND SYSTEM FOR GEOLOCATING AN OBJECT USING A MOBILE BASE STATION

RELATED APPLICATIONS

This application is a § 371 application of PCT/EP2020/064408 filed May 25, 2020, which claims priority from French Patent Application No. 19 05636 filed May 28, 2019, each of which is incorporated herein by reference in its entirety

FIELD OF THE INVENTION

The present invention belongs to the field of geolocating an object, for example to find a lost or stolen object. More particularly, the invention relates to a method and a system for geolocating a terminal of a wireless communication system.

BACKGROUND OF THE INVENTION

The possibility of geolocating a lost or stolen object represents a major issue for many industries. The importance of this issue can be related to the cost of the object itself, but it can also be related to the impact of said object in terms of safety (for example if the object contains dangerous chemicals) or in terms of process (for example if the object is an element necessary to accomplish a step of a process). Consequently, even a low-cost small object can have a high value. The question is how to geolocate these objects in order to find them when they are lost.

There are many methods to geolocate a terminal of a wireless communication system from radio signals exchanged between the terminal and base stations of the wireless communication system.

In the cellular networks of the GSM, UMTS or LTE type, it is known to estimate the position of a terminal as being that of the base station with which it is currently associated, it being understood that a terminal is generally associated with the base station to which it is closest. However, this method has a poor geolocation accuracy since the coverage area of a base station can reach several kilometres, or even several tens of kilometres in radius.

Other methods consist in estimating the distances which separate a terminal from several base stations by calculating the times of arrival or the time differences of arrival of radio signals exchanged between these entities in order to determine the position of the terminal by trilateration (TOA for "Time Of Arrival", or TDOA for "Time Difference Of Arrival"). Similar methods are based on the angles of arrival of the radio signals (this is called triangulation), or else on calculations of frequency differences of arrival (FDOA for "Frequency Difference Of Arrival"). The latter being based on the Doppler effect, it however requires that the terminal whose position is sought i.e. in movement relative to the observation points. These different methods all have the drawback of requiring an accurate synchronization of the different base stations acting as observation points. Furthermore, these methods are particularly sensitive to the phenomenon called multipath phenomenon which corresponds to the propagation of the same radio signal by several paths because of the phenomena of reflection, refraction and diffraction on the encountered obstacles, which results in a limitation of the geolocation accuracy.

Other geolocation methods are based on the received power level (RSSI for "Received Signal Strength Indicator") of a radio signal exchanged between a terminal and a base station. These methods are based on the fact that a radio signal is attenuated in the atmosphere and therefore that the RSSI level of a signal received by a receiver varies depending on the distance which separates the receiver and the emitter from the signal. Thus, it is possible to determine the geographical position of a terminal by trilateration by estimating the distance separating the terminal from the different base stations which surround it from the RSSI levels measured by the base stations. The geolocation accuracy of such a method depends on the density of the base stations on the related geographical area: the greater the density of the base stations in the vicinity of the sought terminal, the better the terminal's geolocation accuracy will be.

Other geolocation methods are based on machine learning techniques which associate a fingerprint with a geographical position. Concretely, the first step is to build a database that associates "radio signatures" with known geographical positions. For each known geographical position, a radio signature corresponds to a set of RSSI levels measured for a terminal located at said known geographical position for a set of base stations of the system. Then, during a search phase, a radio signature observed for a terminal located at an unknown position is compared to all signatures of the database in order to estimate the position of the terminal from the position(s) corresponding to the closest signature(s). It should be noted that the geolocation accuracy of such a method is largely dependent on the amount of reference items in the database and the density of the base stations in the related geographical area.

For wireless communication systems covering large geographical areas (for example at the scale of a city, a region, a country or a continent), the density of base stations of said communication system is generally less than 0.5 base station per square kilometer. The geolocation methods known for such communication systems do not allow obtaining satisfactory accuracy (the obtained accuracy is often in the range of a kilometer, or even several kilometres).

OBJECT AND SUMMARY OF THE INVENTION

The present invention aims at overcoming all or part of the drawbacks of the prior art, in particular those exposed above, by proposing a solution for geolocating an object equipped with a terminal of a wireless communication system. This solution allows geolocating an object with a satisfactory accuracy even in a large geographical area (for example an accuracy of less than five hundred metres for a geographical area in the range of five kilometres per side).

To this end, and according to a first aspect, the present invention proposes a method for geolocation of a terminal of a wireless communication system. The wireless communication system includes fixed base stations, and a geolocation server connected to said fixed base stations. The geographical position of each fixed base station is known by the geolocation server. The geolocation method includes the following steps:

a measurement, for at least one fixed base station, of a parameter representative of a radio signal exchanged between the terminal and said fixed base station, an estimate of a rough geographical position of the terminal from the measurement(s) thus obtained and from the geographical position of each fixed base station for which a measurement has been obtained, a determination of a search area from the estimated rough geographical position, a displacement of a mobile base station in said search area during a predetermined search period, said mobile base station being connected to the geolocation server, an emission, by the terminal, of at least one radio signal during the search period, each radio signal being emitted to the fixed base stations of the wireless communication system and of the mobile base station, a measurement, for each radio signal emitted by the terminal during the search period, of a parameter representative of said radio signal for at least one fixed base station and for the mobile base station, a determination, for each radio signal emitted by the terminal during the search period, of a geographical position of the mobile base station at the time when said radio signal is emitted, an estimate of a precise geographical position of the terminal, on the one hand, from said measurements obtained during the search period, and on the other hand, from the geographical position of each fixed base station for which a measurement has been obtained during the search period and from the geographical position of the mobile base station at the time of emission of each radio signal emitted by the terminal during the search period.

Such arrangements allow in particular artificially increasing the density of base stations in the search area during the search period. The higher the density of base stations in the vicinity of the desired terminal, the better the accuracy of the estimate of the terminal position.

It should be noted that if one of the fixed base stations or the mobile base station does not receive a radio signal emitted by the terminal, a default measurement value of the parameter representative of the radio signal can be assigned. This default value then corresponds to an absence of signal.

In particular embodiments, the invention may further include one or more of the following features, taken in isolation or according to any technically possible combination.

In particular embodiments, the method further includes a remote configuration of the terminal so that the terminal emits radio signals with a predetermined recurrence pattern during the search period.

In particular embodiments, an intermediate geographical position of the terminal is estimated for each radio signal emitted by the terminal during the search period, and the precise geographical position of the terminal is estimated from said intermediate geographical positions.

In particular embodiments, the precise geographical position of the terminal is estimated in the form of a weighted average of the intermediate geographical positions, each intermediate geographical position being weighted depending on the parameters measured for the fixed base stations and the mobile base station for different radio signals emitted during the search period.

In particular embodiments, a virtual signature is determined, said virtual signature including:

a parameter value, for each fixed base station for which at least one measurement has been obtained during the search period, calculated from the measurement(s) obtained for said fixed base station for different radio signals emitted by the terminal during the search period, and a parameter value for each measurement made for the mobile base station during the search period.

The precise geographical position of the terminal being estimated, on the one hand, from said virtual signature, and on the other hand, from the geographical position of each fixed base station used to determine the virtual signature and from the geographical positions of the mobile base station at the different times of emission of the radio signals.

In particular embodiments, an intermediate geographical position of the terminal is estimated for each radio signal emitted by the terminal during the search period. The mobile base station being displaced to said intermediate geographical position before the terminal emits a new radio signal. Different intermediate geographical positions can thus be successively determined during the search period, and the mobile base station is successively displaced to each intermediate position thus determined. The precise geographical position is then estimated as being the last geographical position taken by the mobile base station during the search period.

In particular embodiments, the parameter representative of a radio signal exchanged between the terminal and a base station is a frequency shift observed during the reception of said radio signal by the base station.

According to a second aspect, the present invention relates to a system for geolocating a terminal of a wireless communication system. The geolocation system includes fixed base stations of said wireless communication system whose geographical positions are known, and a geolocation server connected to said fixed base stations. The geolocation server is configured to:

collect, for at least one fixed base station, a measurement of a parameter representative of a radio signal exchanged between the terminal and said fixed base station, and estimate a rough geographical position of the terminal from the measurement(s) thus collected and from the geographical position of each fixed base station for which a measurement has been collected.

The geolocation system further includes a mobile base station connected to the geolocation server.

The geolocation server is configured to:

determine, from the estimated rough geographical position, a search area in which the mobile base station is displaced during a predetermined search period, collect, for at least one radio signal emitted by the terminal to the fixed base stations and the mobile base station during the search period, a measurement of a parameter representative of said radio signal for at least one fixed base station and for the mobile base station, determine, for each radio signal emitted by the terminal during the search period, a geographical position of the mobile base station at the time when said radio signal is emitted, and estimate a precise geographical position of the terminal, on the one hand, from the measurements collected during the search period, and on the other hand, from the geographical position of each fixed base station for which a measurement has been collected and from the geographical position of the mobile base station at the time of emission of each radio signal emitted by the terminal during the search period.

BRIEF DESCRIPTION OF THE FIGURES

The invention will be better understood on reading the following description, given by way of non-limiting example, and made with reference to FIGS. 1 to 4 which represent.

In these figures, identical references from one figure to another designate identical or similar elements. For reasons of clarity, the represented elements are not necessarily on the same scale, unless otherwise indicated.

DETAILED DESCRIPTION OF THE EMBODIMENTS

In the remainder of the description, the case where one is searching for a lost object equipped with a terminal of a wireless communication system is considered.

Figure 1:
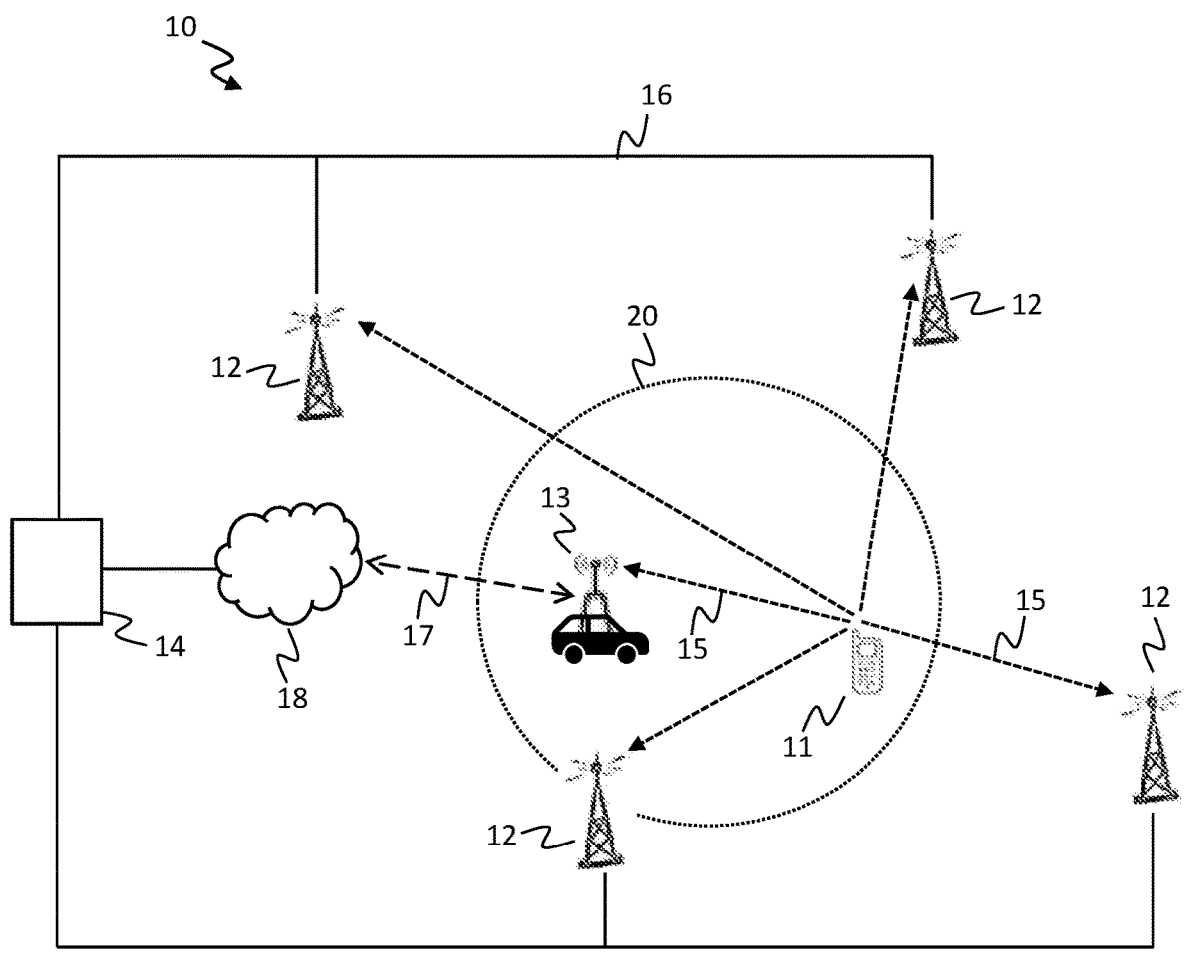
FIG. 1 is a schematic representation of a geolocation system according to the invention.

FIG. 1 schematically represents an example of a geolocation system 10 according to the invention. The geolocation system 10 includes at least one terminal 11 and several fixed base stations 12 of a wireless communication system.

The fixed base stations 12 each have a predetermined geographical position which is known to the geolocation server 14 and which does not change over time. In addition, the fixed base stations 12 are connected to a geolocation server 14, that is to say that there is a communication link 16 between each fixed base station 12 and the geolocation server 14 in order to exchange information between the fixed base stations 12 and the geolocation server 14. This communication link 16 can be a wired link or else a wireless communication link.

In such a system, the communications between a terminal 11 and a fixed base station 12 can generally be bidirectional, that is to say that data can be transmitted from a fixed base station 12 to the terminal 11 on a radio downlink, or else from the terminal 11 to a fixed base station 12 on a radio uplink.

In the remainder of the description, the case of a wireless communication system of the ultra narrow band LPWAN type is considered by way of example and without limitation. Such a wireless communication system (acronym for "Low Power Wide Area Network") is a wide area access network with low energy consumption whose rates are generally less than 100 kbits/s. The term "Ultra Narrow Band" (or UNB) means that the instantaneous frequency spectrum of the radio signals emitted by the terminals has a frequency width of less than two kilohertz, or even less than one kilohertz. The term "radio signal" means an electromagnetic wave propagating via wireless means whose frequencies are comprised in the conventional spectrum of radio waves (a few hertz to several hundred gigahertz). Such UNB wireless communication systems are particularly adapted for applications of the M2M type (acronym for "Machine to Machine") or of the IoT type ("Internet of Things").

In such a wireless communication system, the energy consumption of a terminal 11 for emitting radio signals is minimised such that the service life of a battery of the terminal 11 can last several years without being recharged. Furthermore, the range of radio signals can reach several kilometres or even tens of kilometres.

In such a wireless communication system, the data exchanges are essentially monodirectional, in this case over a radio uplink 15 from a terminal 11 to the fixed base stations 12 of said wireless communication system. In order to minimise the risks of losing a message transmitted by a terminal, the planning of the access network is often carried out such that a given geographical area is simultaneously covered by several fixed base stations 12, such that a message transmitted by a terminal 11 can be received by several fixed base stations 12.

Each fixed base station 12 is adapted to receive messages from the terminals 11 which are within its range. Each message thus received is for example transmitted to the geolocation server 14, possibly accompanied by other information such as an identifier of the fixed base station 12 which has received the message, a value representative of the quality of the radio signal carrying the message, the central frequency on which the message has been received, etc. The server 14 processes, for example, all messages received from the different fixed base stations 12. The server 14 can then be used to implement a method for geolocating a terminal of the system.

In particular, the server 14 can estimate, using conventional geolocation methods, a rough geographical position of the terminal 11, on the one hand, from measurements of a parameter representative of a radio signal exchanged between the terminal 11 and the fixed base stations 12 and on the other hand, from the geographical positions of said fixed base stations 12. This rough geographical position allows determining a search zone 20 in which the terminal 11 has a high probability of being therein.

The geolocation system 10 further includes a mobile base station 13 which has functionalities similar to those of a fixed base station 12 to receive a message originating from the terminal 11 and to communicate with the geolocation server 14. Furthermore, the geographical position of the mobile base station 13 may vary over time. The mobile base station 13 is for example on board a motor vehicle or a drone. The mobile base station 13 is also connected to the geolocation server 14, for example via an access network 18 of another wireless communication system such as a cellular network of the GSM, UMTS or LTE type, or else such as a Wi-Fi network. A wireless communication link 17 can be established between the mobile base station 13 and the access network 18. The geolocation server 14 is connected to said access network 18, for example via a central network of the Internet type (not shown in FIG. 1). Such arrangements allow exchanging information between the geolocation server 14 and the mobile base station 13.

The mobile base station 13 is intended to be displaced in the search area 20 during a predetermined search period. The mobile base station 13 and the fixed base stations 12 are for example configured to measure, for each of one or more radio signal(s) emitted by the terminal 11 during the search period, a parameter representative of said radio signal. According to another example, these measurements of a parameter representative of a radio signal are performed by the terminal 11 then transmitted to the server 14, or else they are performed by the server 14 from information provided by the base stations.

For this purpose, the terminal 11, the fixed base stations 12, the mobile base station 13 and/or the server 14 include a measuring device including, for example, means which are software (computer program product executed on one or more processors) and/or hardware (programmable logic circuit, specialised integrated circuit, discrete electronic components, etc.) configured in order to perform signal processing.

The terminal 11, the fixed base stations 12, the mobile base station 13 and the server 14 further include, in a conventional manner, a communication module to be able to exchange messages on the different communication links 15, 16 and 17.

The mobile base station 13 is also configured to determine, for each radio signal emitted by the terminal 11 during the search period, a geographical position of the mobile base station 13 at the time when said radio signal is emitted, and to send this geographical position to the geolocation server 14. To this end, the mobile base station 13 may include a positioning device, for example a receiver of a satellite navigation system (GNSS for "Global Navigation Satellite System"), allowing providing the current geographical position of the mobile base station 13.

The information relating to the measurement of the parameter representative of the radio signal for a fixed base station 12 is sent by said fixed base station 12 to the geolocation server 14 on the communication link 16.

The information relating to the measurement of the parameter representative of the radio signal for the mobile base station 13 and to the geographical position of the mobile base station 13 at the time when said radio signal is emitted are sent by the mobile base station 13 to the geolocation server 14 via the wireless communication link 17.

The geolocation server 14 can then estimate a precise geographical position of the terminal 11, on the one hand, from the measurements carried out during the search period for the fixed base stations 12 and the mobile base station 13, and on the other hand, from the geographical positions of the fixed base stations 12 and the geographical positions of the mobile base station 13 at the different times of emission of the radio signals.

For this purpose, the server 14 includes for example one or more processors and storage means (magnetic hard disk, electronic memory, optical disc, etc.) in which a computer program product is stored, in the form of a set of program code instructions to be executed to implement all or part of the steps of a method for geolocation of a terminal. Alternatively or in addition, the server 14 includes one or more programmable logic circuit(s) (FPGA, PLD, etc.), and/or one or more specialised integrated circuit(s) (ASIC), and/or a set of discrete electronic components, etc., adapted to implement all or part of said steps.

In other words, the server 14 includes means which are software (specific computer program product) and/or hardware (FPGA, PLD, ASIC, discrete electronic components, etc.) configured to implement the steps of a method for estimating a time of arrival of a message.

Figure 2:
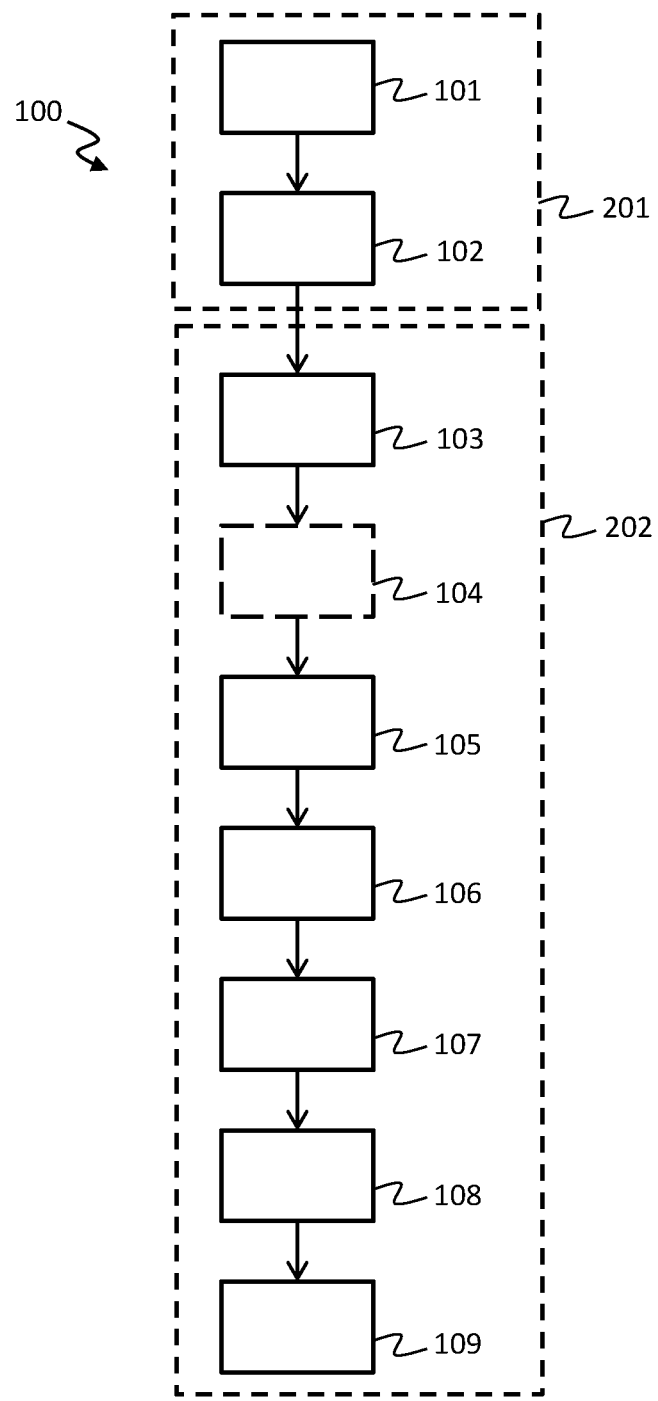
FIG. 2 is a schematic representation of the main steps of a particular implementation of the geolocation method according to the invention.

FIG. 2 schematically represents the main steps of a particular implementation of the geolocation method 100 according to the invention.

The geolocation method 100 includes a step 101 of measuring, for at least one fixed base station 12, a parameter representative of a radio signal exchanged between the terminal 11 and said fixed base station 12.

It should be noted that this parameter can be measured by the fixed base station 12 (in the case of a radio signal emitted by the terminal 11 to the fixed base stations 12), or else by the terminal 11 (in the case where there are the fixed base stations 12 which emit radio signals to the terminal 11). It is also conceivable that the parameter is measured by the geolocation server 14 from information sent by the fixed base stations 12. In the remainder of the description, the case where the parameter is measured by the fixed base stations 12 for a radio signal emitted by the terminal 11 to the fixed base stations 12, is considered by way of non-limiting example According to a first example, this parameter is a received power level for the radio signal (RSSI). According to other examples, the parameter is a time of arrival or a time difference of arrival of the radio signal at the fixed base stations 12 (TOA or TDOA method). According to yet another example, the parameter is a frequency difference of arrival of the radio signal at the level of the fixed base stations 12 (FDOA method).

The geolocation method 100 also includes a step 102 of estimating a rough geographical position of the terminal 11 from the measurements carried out in step 101 and from the geographical positions of the fixed base stations 12 for which a measurement has been obtained.

Steps 101 and 102 thus correspond to a first phase 201 where a conventional method for geolocating a terminal 11 of a wireless communication system is applied. This conventional method can be based, as previously indicated, on trilateration methods using estimations of the distance separating the terminal from the different base stations, or else on machine learning methods using radio signatures of the terminal. The choice of a particular method is only a variation of the invention.

The geolocation method 100 then includes a step 103 of determining a search area 20 from the rough geographical position estimated in step 102. As illustrated in FIG. 1, the search area 20 is for example delimited by a circle centred on the estimated rough geographical position and whose radius is such that the probability that the terminal 11 is located inside the circle is greater than a predetermined value. The probability that the terminal 11 is located inside the circle corresponds to a calculated geolocation error, in a manner known to the person skilled in the art, by the method applied for the phase 201.

The geolocation method 100 then includes a step 105 of displacing the mobile base station 13 in the search area 20 during a predetermined search period.

The geolocation method 100 also includes a step of emitting 106, by the terminal 11, one or more radio signal(s) during the search period. Each radio signal is emitted to the fixed base stations 12 and to the mobile base station 13. In the remainder of the description, it is considered by way of a non-limiting example that the terminal 11 emits several radio signals during the search period.

The mobile base station 13 can for example be displaced in the search area 20 during the search period according to a predetermined displacement plan. According to another example, the mobile base station 13 can be displaced in the search area 20 depending on intermediate geographical positions estimated for each radio signal emitted by the terminal 11 during the search period.

The geolocation method 100 includes a measurement step 107, for each radio signal emitted by the terminal 11 during the search period, of a parameter representative of said radio signal for at least one fixed base station 12 and for the mobile base station 13. This parameter can be the same as that used during the first phase 201 by the conventional geolocation method to provide a rough estimate of the geographical position of the terminal 11. However, nothing prevents a different parameter from being used. It may in particular be an RSSI level, or a TOA, TDOA or FDOA value. In the remainder of the description, it is considered by way of non-limiting example that at least one measurement is obtained for several different fixed base stations 12 during the search period.

It should be noted that the invention is not limited to the use of a single parameter representative of a radio signal exchanged between the terminal 11 and a base station 12, 13. It is indeed possible to measure several different parameters and to estimate the geographical position of the terminal 11 from these different parameters.

In particular embodiments, the parameter representative of a radio signal exchanged between the terminal 11 and a fixed base station 12 or the mobile base station 13 is a frequency shift observed during the reception of said radio signal by the fixed base station 12 or by the mobile base station 13. This particular implementation is in particular advantageous because the mobile base station 13 is displaced and therefore there is a relative movement between the mobile base station 13 and the fixed base stations 12 and between the mobile base station 13 and the terminal 11. This is indeed a necessary condition for FDOA type methods to obtain good geolocation performance in terms of accuracy. Advantageously, the speed vectors of the mobile base station 13 at the times of reception of the radio signals emitted by the terminal 11 can be provided to the geolocation server 14 in order to improve the accuracy of the geolocation.

The geolocation method 100 also includes a step of determining 108, for each radio signal emitted by the terminal 11 during the search period, a geographical position of the mobile base station 13 at the time when said radio signal is emitted. This geographical position is for example determined using a positioning device, for example a GPS receiver, associated with the mobile base station 13. It can be considered that the difference between the time when a radio signal is emitted by the terminal 11 during the search period and the time when said radio signal is received by the mobile base station 13 is negligible. In other words, the time when the radio signal is emitted by the terminal 11 is substantially the same as the time when the radio signal is received by the mobile base station 13.

Finally, the geolocation method 100 includes a step 109 of estimating a precise geographical position of the terminal 11, on the one hand, from the measurements carried out during the search period for the fixed base stations 12 and the mobile base station 13, and on the other hand, from the geographical positions of the fixed base stations 12 and the geographical positions of the mobile base station 13 at the different times of emission of the radio signals.

Steps 103 to 109 thus correspond to a second phase 202 during which the mobile base station 13 artificially increases the density of base stations present in the vicinity of the terminal 11. Indeed, during the search period, everything happens as there was a virtual fixed base station at each geographical position at which the mobile base station 13 receives a radio signal emitted by the terminal 11.

The method used to estimate the precise geographical position of terminal 11 in step 109 may be the same method as that used in step 102, or else a different method. As the density of base stations present in the vicinity of the terminal 11 is artificially more significant during the phase 202 than during the phase 201, the estimate 109 of the geographical position of the terminal 11 carried out during phase 202 is more accurate than the estimate 102 carried out during phase 201.

Optionally, the geolocation method 100 can also include a step of remote configuration 104 of the terminal 11 so that the terminal 11 emits radio signals at a predetermined frequency during the search period. Indeed, in wireless communication systems of the IoT or M2M type, the terminals are generally configured to transmit messages with a low frequency (for example only a few messages per day), in particular to reduce the energy consumption of the terminals. In such a case, the search period could have a particularly long duration, in particular if it is desired to obtain a large number of measurements for the mobile base station 13 at different positions in the search area 20 in order to increase the geolocation accuracy. In order to overcome this problem, it is possible to configure the terminal 11 to force it to transmit messages (that is to say radio signals) with a more significant frequency.

The configuration 104 of the terminal 11 is for example carried out by transmitting a message for activating a search mode to the terminal 11 from one or more fixed base station(s) 12 and/or from the mobile base station 13. The search mode activation message includes for example a start date of the search period, a duration of the search period and a frequency at which the terminal 11 must emit radio signals during the search period.

In particular embodiments, and in order to prevent the terminal 11 from listening indefinitely to an activation message from a base station 12, 13, one or more daily listening time window(s) is (are) predetermined. For example, the terminal goes into listening mode for an activation message only between eight and nine in the morning and between noon and one in the afternoon.

In particular embodiments, the terminal 11 switches to the search mode upon receipt of the activation message.

In particular embodiments, when the search mode is activated, the terminal 11 remains in listening for a downlink message and the search mode can be deactivated by receiving a message for deactivating the search mode from one or more fixed base station(s) 12 and/or from the mobile base station 13.

In particular embodiments, a recurrence pattern with which the terminal 11 must emit radio signals during the search period is calculated by the terminal 11 depending on a charge level of the battery of the terminal 11. The recurrence pattern can for example correspond to a repetition period of a radio signal. According to another example, the recurrence pattern can indicate increasingly long temporary intervals between the emissions of the radio signals as the charge level of the battery of the terminal 11 decreases.

In particular embodiments, the terminal 11 remains in search mode as long as the duration of the search period has not elapsed, or as long as the terminal 11 has not received a message for deactivating the search mode, or as long as the battery of the terminal 11 is not completely discharged.

It should be noted that the order of steps 101 to 109 of the geolocation method 100 is not necessarily fixed. For example, nothing prevents the optional configuration step 104 of the terminal 11 from taking place before one of steps 101 to 103. According to another example, the order of steps 107 and 108 is not necessarily important.

During the search period, different methods can be considered for displacing the mobile base station 13 in the search area 20.

Figure 3:
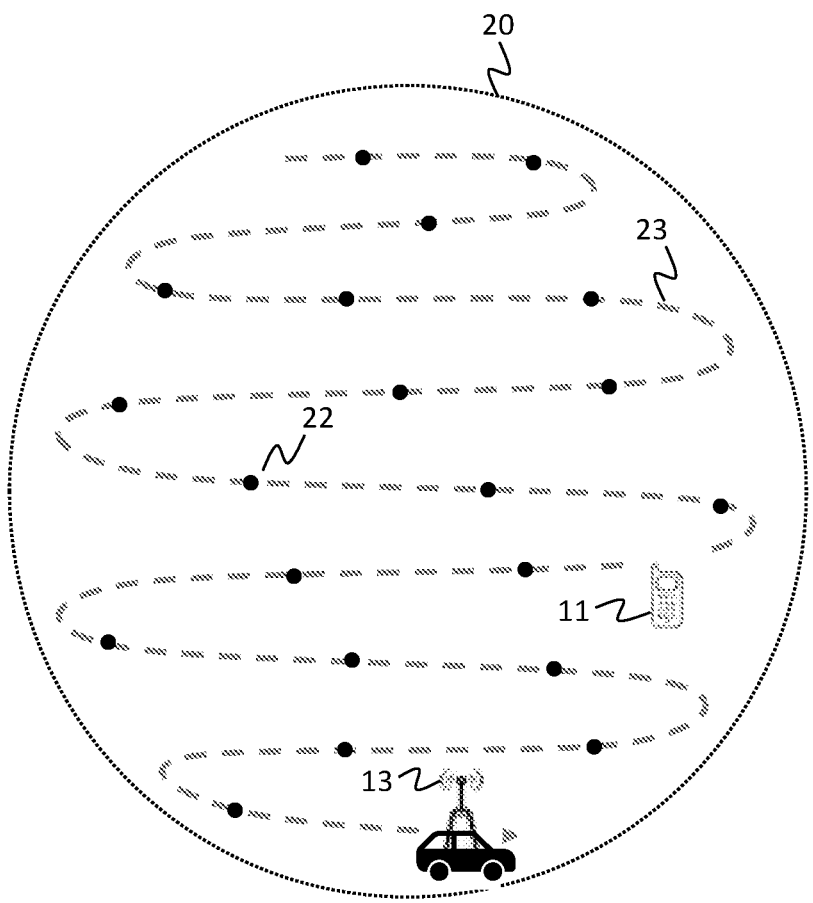
FIG. 3 is a schematic representation of a particular displacement mode of the mobile base station in the search area.

FIG. 3 schematically represents an example implementation of the step 105 of displacing the mobile base station 13 in the search area 20. In this example, the mobile base station 13 is displaced along a predetermined displacement plane 23, independently of the reception of the radio signals emitted by the terminal 11 during the search period. The displacement plane 23 determines, for example, a series of successive directions that the mobile base station 13 must take, as well as the speed at which the mobile base station 13 is displaced. Possibly, the displacement plane can define times or geographical positions at which the mobile base station 13 can temporarily stop. As previously indicated, the mobile base station 13 can be mounted on board a vehicle such as a motor vehicle or a drone, but it can also be carried by a human operator. During the search period, the mobile base station 13 receives radio signals emitted by the terminal 11 during the search period at different positions 22. In this example implementation of the displacement step 105, the mobile base station 13 may be in displacement when it receives a radio signal emitted by the terminal 11.

It should be noted that FDOA type methods are particularly well adapted to the implementation described in FIG. 3 insofar as there is a relative displacement between the terminal 11 and the mobile base station 13.

Figure 4:
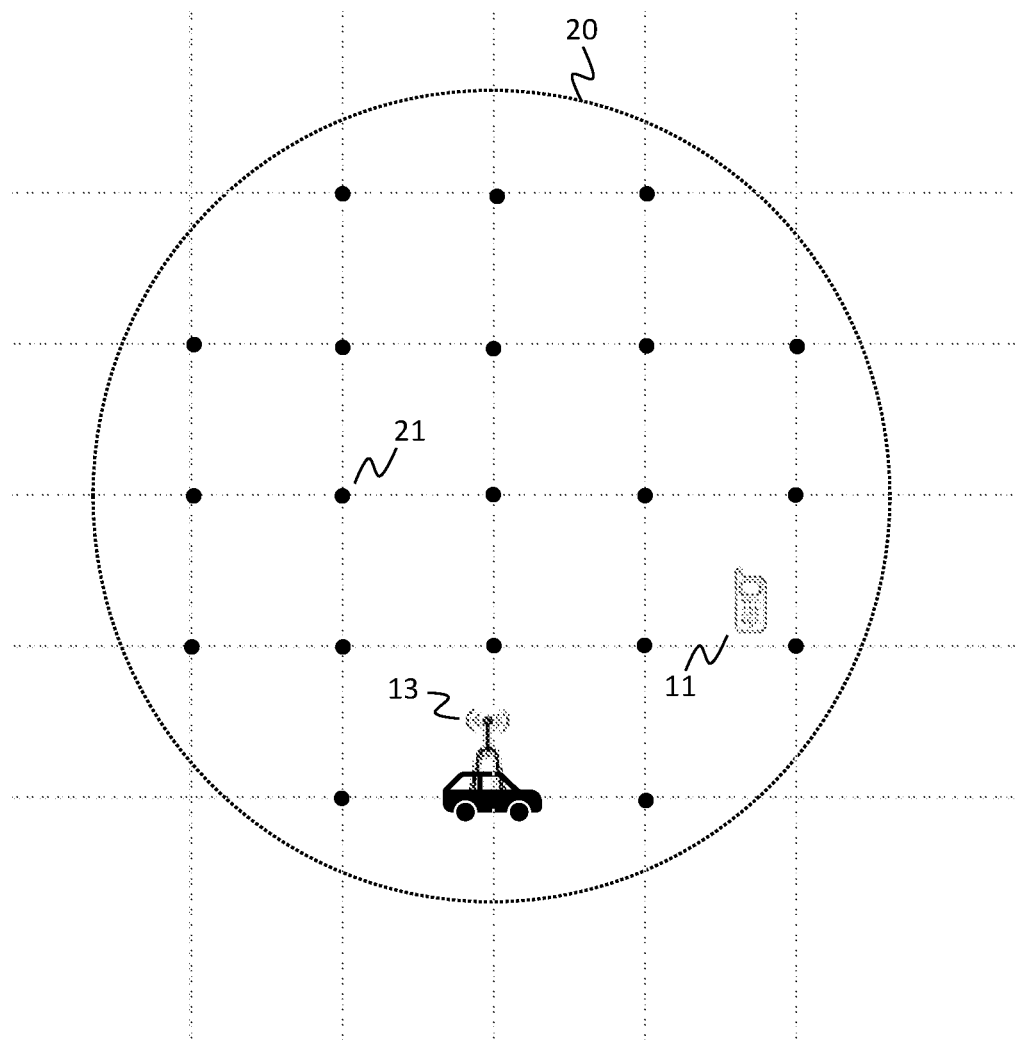
FIG. 4 is a schematic representation of another particular displacement mode of the mobile base station in the search area.

FIG. 4 schematically represents another example implementation of the step 105 of displacing the mobile base station 13 in the search area 20. In this example, the mobile base station 13 is displaced successively into different predetermined positions. 21. The mobile base station 13 stops long enough at each of said predetermined positions 21 in order to receive at least one radio signal from the terminal 11.

In particular embodiments of the geolocation method 100 according to the invention, the mobile base station 13 is displaced in the search area 20 (step 105) according to any one of the methods described with reference to FIGS. 3 and 4. In step 109 of estimating a precise geographical position of the terminal 11, a virtual signature is determined. The virtual signature includes:
- a parameter value, for each fixed base station 12, calculated from the measurements carried out by said fixed base station 12 for the different radio signals emitted by the terminal 11 during the search period, and
- a parameter value for each measurement carried out by the mobile base station 13 during the search period.

The precise geographical position of the terminal 11 is then estimated, on the one hand, from the virtual signature, and on the other hand, from the geographical positions of the fixed base stations 12 and from the geographical positions of the mobile base station 13 at the different times of emission of the radio signals.

For example, the considered parameter is an RSSI value measured by a fixed base station 12 or by the mobile base station 13 for a radio signal emitted by the terminal 11. The virtual signature can then correspond to all the following values:
- for each fixed base station 12, the maximum value (or else the average value, according to another example) of the RSSI measurements measured by said fixed base station 12 for the different signals emitted by the terminal 11 during the search period, and
- the RSSI value measured by the mobile base station 13 for each radio signal emitted by the terminal 11 during the search period.

The mobile base station 13 having a different geographical position each time it carries out an RSSI measurement for a new radio signal emitted by the terminal 11 during the search period, everything happens as if the number of fixed base stations 12 located in the vicinity of the terminal 11 and used to estimate the geographical position of the terminal 11 was artificially increased. Indeed, if there are K fixed base stations 12 used to estimate the geographical position of the terminal 11, and if it is considered that terminal 11 emits N different radio signals during the search period, then the virtual signature includes (N+K) RSSI measurements carried out for (N+K) base stations 12, 13 located at different geographical positions. Everything therefore takes place as if there were virtually (N+K) fixed base stations 12 used to estimate the geographical position of the terminal 11 in step 109. This increase in the density of base stations in the vicinity of the terminal 11 during the search period leads to an improvement in the accuracy of the geolocation of terminal 11.

In other particular embodiments of the geolocation method 100, the mobile base station 13 is displaced in the search area 20 (step 105) according to any one of the methods described with reference to FIGS. 3 and 4. An intermediate geographical position of the terminal 11 is estimated for each radio signal emitted by the terminal 11 during the search period, and the precise geographical position of the terminal 11 is estimated from said intermediate geographical positions.

For example, for a radio signal emitted by the terminal 11 during the search period, an intermediate geographical position is estimated from the RSSI measurements carried out by the fixed base stations 12 and by the mobile base station 13. The precise geographical position of the terminal 11 is estimated in step 109 as being the barycenter of the intermediate geographical positions estimated during the search period. Consider for example that N radio signals are emitted by the terminal 11 during the search period and denote by P(i) the estimated intermediate geographical position for the radio signal of index i. The precise geographical position, denoted P, of the terminal 11 is calculated as follows from:

$$P = \frac{1}{N}\Sigma_{i=1}^{N} P(i). \qquad \text{Equation 1}$$

In particular embodiments, the precise geographical position of the terminal 11 is estimated in the form of a weighted average of the intermediate geographical positions. Each intermediate geographical position is weighted depending on the parameters measured for the fixed base stations 12 and the mobile base station 13 for the different radio signals emitted during the search period.

Thus, in the considered example, the precise geographical position of the terminal 11 can be calculated as follows:

$$P = \frac{1}{\Sigma_{i=1}^{N} e^{-\frac{max(RSSI(i))}{RSSI_{max}}}} \Sigma_{i=1}^{N} P(i) \cdot e^{-\frac{max(RSSI(i))}{RSSI_{max}}} \qquad \text{Equation 2}$$

where:
- max (RSSI (i)) is the maximum value among the RSSI values measured by the fixed base stations 12 and by the mobile base station 13 for the radio signal of index i, and
- $RSSI_{max}$ is the maximum value from all RSSI values measured by the fixed base stations 12 and by the mobile base station 13 for the N radio signals emitted by the terminal 11 during the search period.

Such arrangements allow giving more importance to intermediate positions for which a high maximum RSSI level is observed.

Figure 5:
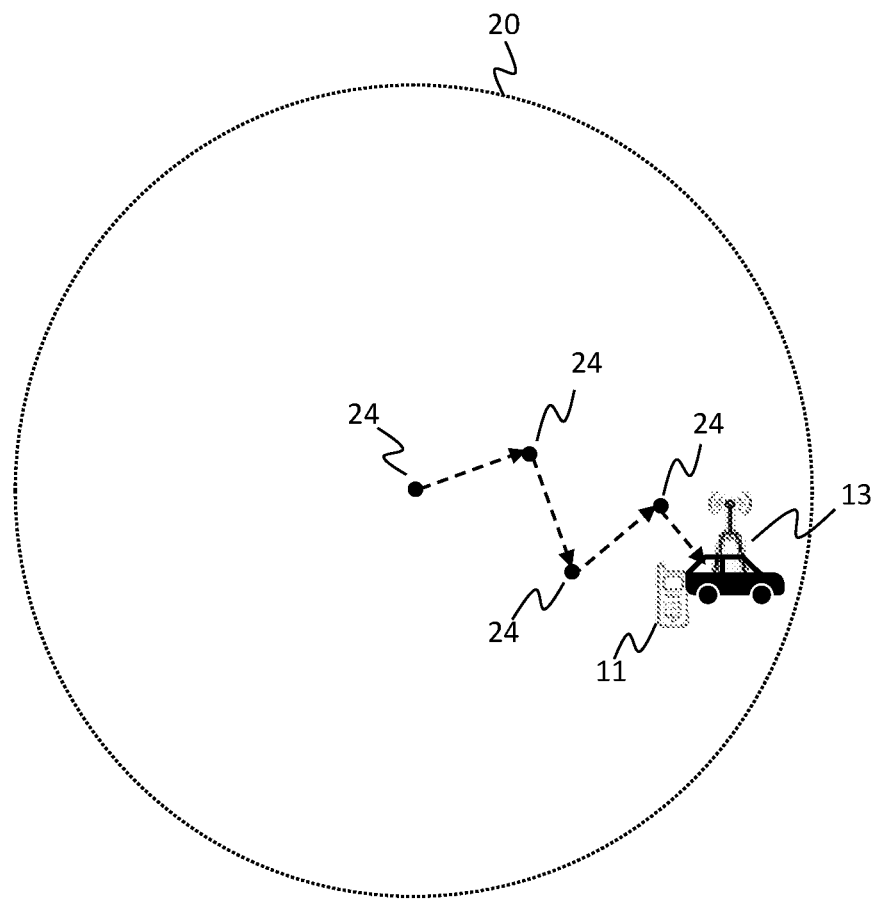
FIG. 5 is a schematic representation of a particular implementation of the geolocation method according to the invention.

FIG. 5 schematically represents another particular implementation of the geolocation method 100 according to the invention.

In this particular implementation, in step 105 the mobile base station 13 is successively displaced into an intermediate geographical position 24 which corresponds to a geographical position estimated by the server 24 from the measurements carried out for a received radio signal at a previous intermediate geographical position.

For example, the first intermediate geographical position corresponds to the rough geographical position estimated during the first phase 201 in the estimation step 102. The mobile base station 13 remains at this first geographical position until it receives a radio signal emitted by the terminal 11. A second intermediate geographical position is then estimated by the server 14 from the measurements carried out by the fixed base stations 12 and by the mobile base station 13 for this radio signal. The mobile base station 13 is then displaced to the second intermediate geographical position. The mobile base station 13 remains at this second intermediate geographical position until receiving a new radio signal emitted by the terminal 11. A third intermediate geographical position is then estimated by the server 14 from the measurements carried out by the fixed base stations 12 and by the mobile base station 13 for this new radio signal. The mobile base station 13 is then displaced to the third intermediate geographical position, and so on . . . .

It should be noted that each intermediate geographical position can be estimated not only from the radio signal received by the terminal 11 positioned at the previous intermediate geographical position, but also from several radio signals received respectively at several previous intermediate geographical positions.

The precise geographical position of the terminal 11 is then estimated in step 109 as being the last geographical position taken by the mobile base station 13 during the search period. The accuracy of the geolocation improves iteratively with each displacement of the mobile base station 13, as the mobile base station 13 approaches the sought terminal 11.

The method used during the first phase 201 to estimate the rough geographical position of the terminal 11 may be different from the method used during the second phase 202 to estimate the precise geographical position of the terminal 11. For example, the method used during the first phase may be a method of geolocation by machine learning which associates a radio signature of a terminal 11 (that is to say for example a set of RSSI values measured respectively by the fixed base stations 12 for a radio signal emitted by the terminal 11) to a geographical position of the terminal 11. The method used during the second phase can however be based on a multilateration method from the RSSI measurements carried out by the fixed base stations 12 and by the mobile base station 13. It is indeed generally not possible to use the measurements carried out by the mobile base station 13 with a machine learning method because the reference radio signatures in the database have no information relating to the mobile base station 13.

During the search period, it is also possible, for each radio signal emitted by the terminal 11, to estimate, on the one hand, a position $P_1$ of the terminal 11 from a conventional geolocation method using only fixed base stations 12, and on the other hand, to estimate a position $P_2$ of the terminal 11 from a geolocation method according to the invention further using the mobile base station 13. It is then possible, for each radio signal emitted by terminal 11 during the search period, to model the relative importance of one method relative to the other and to define a position P of terminal 11 as being a combination of the position $P_1$ and the position $P_2$:

$$P = \frac{1}{Z}(P_1 \cdot (1-w) + P_2 \cdot w) \qquad \text{Equation 3}$$

where:
Z is a normalisation constant,
w is a function modelling the importance of the two estimation methods relative to each other, for example:

$$w = e^{-\frac{|RSSI_{max} - \min(RSSI_{max} \cdot RSSI_i)|}{\sigma}} \qquad \text{Equation 4}$$

where:
$RSSI_{max}$ is the maximum value of the RSSI values considered for a base station of the system 10 (for example $RSSI_{max} = -90$ dBm),
$RSSI_i$ is the value of RSSI measured by the mobile base station 13 for the radio signal of index i, and
$\sigma$ is a dimensioning parameter (for example $\sigma = 10$ dBm).

It should be noted that $RSSI_{max}$ does not necessarily correspond to the maximum value that can be measured by a base station, but it can take any value. $RSSI_{max}$ allows maximising the values of RSSI in the equation 4 above.

In the considered example, the more a radio signal emitted by the terminal 11 during the search period is received by the mobile base station 13 with a high RSSI level, the more the position $P_2$ will have a significant point compared to the position $P_1$.

The position of the terminal 11 can then be estimated depending on the different positions P estimated respectively for the different radio signals emitted by the terminal 11 during the search period.

The above description clearly illustrates that, by virtue of the different features and advantages thereof, the present invention achieves the objectives which are set. The geolocation method 100 according to the invention allows in particular accurately estimating the geographical position of a terminal 11 from measurements performed by a set of fixed base stations 12 of a communication system without having to increase the density of fixed base stations. Indeed, according to the invention, the density is virtually increased by the use of a mobile base station 13 displaced in the search area 20.

More generally, it should be noted that the embodiments considered above have been described by way of non-limiting examples, and that other variants can therefore be considered.

In particular, different methods can be used for the step 105 of displacing the mobile base station 13 to the search area 20 during the search period.

Also, the fact of choosing a particular parameter representative of a radio signal exchanged between the terminal and a base station to implement the geolocation method according to the invention only constitutes a variant of the invention.

Finally, and as previously indicated, there are different methods for making an estimate of the geographical position of the terminal 11 in step 102 and/or in step 109. The choice of a particular method is again only a variant of the invention.

The invention claimed is:

1. A method for geolocating a terminal of a wireless communication system, the wireless communication system comprising fixed base stations, and a geolocation server connected to the fixed base stations, a geographical position of each fixed base station being known by the geolocation server, the method comprising:
- measuring, for at least one fixed base station, a parameter representative of a radio signal exchanged between the terminal and said at least one fixed base station;
- estimating an approximate geographical position of the terminal from the measurement thus obtained and from the geographical position of said at least one fixed base station for which the measurement has been obtained;
- determining a search area from the approximate geographical position estimated;
- displacing a mobile base station in the search area during a predetermined search period, the mobile base station configured to communicate with the geolocation server;
- transmitting, by the terminal, at least one radio signal during the predetermined search period, said at least one radio signal being transmitted to the fixed base stations of the wireless communication system and of the mobile base station;
- measuring, for each radio signal transmitted by the terminal during the predetermined search period, a parameter representative of said each radio signal for said at least one fixed base station and for the mobile base station;
- determining, for said each radio signal transmitted by the terminal during the predetermined search period, a geographical position of the mobile base station at a time when said each radio signal is transmitted; and
- estimating a precise geographical position of the terminal from the measurement for said each radio signal obtained during the predetermined search period, from the geographical position of said at least one fixed base station for which the measurement has been obtained during the predetermined search period and from the geographical position of the mobile base station at the time of transmission of said each radio signal transmitted by the terminal during the predetermined search period.

2. The method of claim 1, further comprising remotely configuring the terminal so that the terminal transmits said at least one radio signal with a predetermined recurrence pattern during the predetermined search period.

3. The method of claim 1, further comprising estimating an intermediate geographical position of the terminal for said each radio signal transmitted by the terminal during the predetermined search period; and wherein of the precise geographical position of the terminal is estimated from the intermediate geographical positions.

4. The method of claim 3, wherein the precise geographical position of the terminal is estimated from a weighted average of the intermediate geographical positions, each intermediate geographical position being weighted depending on the parameters measured during the predetermined search period for said at least one fixed base station and the mobile base station for different radio signals transmitted during the predetermined search period.

5. The method of claim 1, further comprising determining a virtual signature, the virtual signature comprising: a parameter value, for said each fixed base station for which at least one measurement has been obtained during the predetermined search period, calculated from said at least one measurement obtained for said each fixed base station for different radio signals transmitted by the terminal during the predetermined search period; and a parameter value for each measurement made for the mobile base station during the predetermined search period; and wherein the precise geographical position of the terminal is estimated from the virtual signature, and from the geographical position of said each fixed base station used to determine the virtual signature and from the geographical positions of the mobile base station at different times of transmission of the different radio signals.

6. The method of claim 1, further comprising estimating an intermediate geographical position of the terminal for said each radio signal transmitted by the terminal during the predetermined search period, the mobile base station being displaced to the intermediate geographical position before the terminal transmits a new radio signal, and wherein the precise geographical position is estimated as being a last geographical position taken by the mobile base station during the predetermined search period.

7. The method of claim 1, wherein a parameter representative of a radio signal exchanged between the terminal and the mobile base station is a frequency shift observed during reception of the radio signal by the mobile base station.

8. The method of claim 1, wherein the parameter representative of the radio signal exchanged between the terminal and said at least one fixed base station is a frequency shift observed during reception of the radio signal by said at least one fixed base station.

9. A geolocation system to geolocate a terminal of a wireless communication system, comprising:
- fixed base stations of the wireless communication system whose geographical positions are known;
- a mobile base station configured to communicate with the geolocation server;
- a geolocation server connected to the fixed base stations, the geolocation server being configured to:
- collect, for at least one fixed base station, a measurement of a parameter representative of a radio signal exchanged between the terminal and said at least one fixed base station;
- estimate an approximate geographical position of the terminal from the measurement thus collected and from the geographical position of said at least one fixed base station for which the measurement has been collected;
- determine, from the estimated approximate geographical position, a search area in which the mobile base station is displaced during a predetermined search period,
- collect, for at least one radio signal transmitted by the terminal during the predetermined search period, a measurement of a parameter representative of said at least one radio signal for at least one fixed base station and for the mobile base station;
- determine, for each radio signal transmitted by the terminal during the predetermined search period, a geographical position of the mobile base station at a time when said each radio signal is transmitted; and
- estimate a precise geographical position of the terminal from the measurements collected during the predetermined search period, from the geographical position of said each fixed base station for which a measurement has been obtained during the predetermined search period, and from the geographical position of the mobile base station at the time of transmission of said each radio signal transmitted by the terminal during the predetermined search period.

* * * * *